United States Patent [19]

Takemoto et al.

[11] 4,189,419

[45] Feb. 19, 1980

[54] PRESSURE-SENSITIVE ADHESIVES BASED ON CARBOXYLATED SBR EMULSION

[75] Inventors: Shiro G. Takemoto, Glendora; Owen J. Morrison, Pasadena, both of Calif.

[73] Assignee: Avery International Corporation, San Marino, Calif.

[21] Appl. No.: 933,161

[22] Filed: Aug. 14, 1978

[51] Int. Cl.² .................... C08L 9/08; C08L 93/00
[52] U.S. Cl. .................. 260/29.7 NR; 260/27 BB; 260/29.2 UA; 260/29.7 H; 260/29.7 DP; 260/33.6 R
[58] Field of Search ............. 260/27 BB, 29.7 NR, 260/29.7 H, 29.7 DP, 29.2 UA, 33.6 R

[56] References Cited

U.S. PATENT DOCUMENTS

| | | | |
|---|---|---|---|
| 3,341,392 | 9/1967 | Potter | 161/137 |
| 3,409,569 | 11/1968 | Lane et al. | 260/8 |
| 3,872,064 | 3/1975 | Pace et al. | 260/887 |
| 3,912,676 | 10/1975 | Brizzolara et al. | 260/29.7 H |
| 3,920,600 | 11/1975 | Abramjian | 260/29.7 UA |
| 3,951,900 | 4/1976 | Bath | 260/29.7 S |
| 3,966,661 | 6/1976 | Feast et al. | 260/29.7 H |
| 4,001,167 | 1/1977 | Tungseth et al. | 260/27 BB |
| 4,036,804 | 7/1977 | Hirai et al. | 260/29.7 SQ |
| 4,038,346 | 7/1977 | Feeney | 260/887 |
| 4,072,735 | 2/1978 | Ardemagni | 260/897 A |

*Primary Examiner*—H. S. Cockeram
*Attorney, Agent, or Firm*—Christie, Parker & Hale

[57] ABSTRACT

Emulsion pressure-sensitive adhesives including a carboxylated styrene-butadiene polymer emulsion and an emulsified tackifying resin are described.

12 Claims, No Drawings

PRESSURE-SENSITIVE ADHESIVES BASED ON CARBOXYLATED SBR EMULSION

BACKGROUND OF THE INVENTION

This invention relates to emulsion pressure-sensitive adhesives for pressure-sensitive labels and the like.

Pressure-sensitive adhesives based on styrene-butadiene rubber (SBR) polymers and tackifying resins are widely used. They have the advantages of low cost and good adhesive properties. However, commercially available SBR pressure-sensitive adhesives have been solvent based. Such adhesives are applied to a substrate such as a label stock and the solvent is evaporated to leave behind a permanently tacky film. The solvents which are evaporated from the label structure during drying of the pressure-sensitive adhesive film can escape into the atmosphere and contribute to air pollution. Environmental regulations limiting the venting of solvents into the atmosphere are becoming increasingly stringent. In addition, cost of the solvents is increasing rapidly. For these reasons, the large scale use of solvent-based adhesives is becoming less and less attractive.

Pressure-sensitive adhesives which are applied as aqueous emulsions have found favor because the venting of solvents into the atmosphere is substantially eliminated. Polymers which perform well in solvent-based, pressure-sensitive adhesive systems do not necessarily perform well in emulsion systems. The majority of emulsion pressure-sensitive adhesives intended for applications such as adhesive labels and the like, have been based on acrylic polymer emulsions. Acrylic emulsion pressure-sensitive adhesives have excellent mechanical stability, i.e., they resist coagulation when subjected to high shear conditions, such as conditions prevailing in certain types of coating machinery. In addition, acrylic emulsion adhesives have excellent adhesive properties in the dry film state. The primary disadvantage of the acrylic emulsion adhesives is their relatively high cost.

SBR emulsions are significantly lower in cost than acrylic emulsions. Although SBR polymers perform well in solvent-based adhesive systems, they have not found commercial acceptance in emulsion-based systems. A variety of adhesive compositions containing carboxylated SBR emulsions have been described. For example, U.S. Pat. No. 3,966,661 to Feast et al describes the preparation of carboxylated SBR latexes and discloses their use in carpet backings and paper coating applications. However, the use of carboxylated SBR emulsion in combination with a tackifying resin emulsion in a pressure-sensitive adhesive is not disclosed.

U.S. Pat. No. 3,951,900 to Bath describes a fire-retardant adhesive, which includes a carboxylated SBR emulsion and gypsum powder and other ingredients. The adhesive disclosed is not pressure-sensitive adhesive, but rather must be dried to perform its adhesive function.

U.S. Pat. No. 3,920,600 to Ahranjian describes pressure-sensitive adhesives which contain a carboxylated neoprene latex and an emulsified tackifier resin. Pressure-sensitive adhesives containing carboxylated SBR emulsions are not described.

U.S. Pat. No. 4,036,804 to Herai et al describes adhesive compositions for bonding a rubber material to metal substrate, which contain an aqueous carboxylated SBR emulsion, a vulcanizing agent and a vulcanization accelerator. Pressure-sensitive adhesives are not described.

U.S. Pat. No. 3,341,392 to Potter describes the use of carboxylated SBR latexes for the lamination of sheets of fibrous materials such as paper and cardboard. The described adhesives contain a carbohydrate adhesive such as starch. Pressure-sensitive adhesives are not described.

Although carboxylated SBR emulsions have been commercially available for some time, it has not been heretofore appreciated that such emulsions can be combined with tackifying resin emulsions to produce a commercially satisfactory pressure-sensitive adhesive.

SUMMARY OF THE INVENTION

Pressure-sensitive adhesive compositions of the present invention comprise a carboxylated SBR polymer emulsion and at least one tackifying resin emulsion. Preferably both the SBR and the tackifying resin are emulsified with an anionic emulsifier such as a rosin acid soap. The aqueous emulsion of the carboxylated SBR polymer has a bound styrene content of less than about 50 percent and at least about 0.5 percent carboxylation.

DETAILED DESCRIPTION OF THE INVENTION

Carboxylated SBR emulsions useful in the compositions of the present invention are commercially available from a number of suppliers. In addition, the preparation of useful carboxylated SBR emulsions is described in the above-mentioned U.S. Pat. No. 3,966,661 to Feast et al, which is incorporated herein by reference.

Briefly, carboxylated SBR emulsions are prepared by emulsion polymerization of butadiene, styrene, and one or more unsaturated acids, such as acrylic acid, methacrylic acid, crotonic acid, maleic acid, fumaric acid, itaconic acid, and 3-butene-1,2,3-tricarboxylic acid. Substituted monocarboxylic acids and substituted polycarboxylic acids may be used if desired. The amount of carboxylic acid used is about 0.5 to 5 percent by weight based on the total monomers. Preferably the carboxylated SBR polymer contains above about one weight percent of such a carboxylic acid monomer. For example, between about one and five weight percent of a carboxylic acid monomer, notably acrylic acid or methacrylic acid. The unsaturated acid may be ethylenically unsaturated monocarboxylic acid, polycarboxylic acid or a mixture of such acids. Preferably, the acids have from two to about ten carbon atoms.

The carboxylated SBR polymer, of which the emulsion is formed, preferably has less than about 50 weight percent bound styrene. For example, between about 20 and 50 weight percent bound styrene, and preferably between about 35 and 50 percent bound styrene. If the bound styrene content of the SBR polymer is less than about 20 weight percent, the adhesive strength of the resulting pressure-sensitive adhesive composition can be unacceptably low. If the bound styrene content is greater than about 50 weight percent, the resulting adhesive composition has low tack.

As mentioned earlier, suitable carboxylated SBR emulsions having the proper carboxylic acid content and styrene content are commercially available. For example, suitable commercially available carboxylated SBR emulsions include: Goodyear LPF4744 from Goodyear Tire and Rubber Co.; DOW 283 from Dow Chemical Co.; AMSCO 4125 from Union Oil Corp.;

Reichhold DL2613 from Reichhold Chemicals, Inc., and the like.

To provide an adhesive composition having sufficiently high viscosity and good coatability, the carboxylated SBR emulsion used to formulate the adhesive composition preferably has a solids content of at least about 40 weight percent, for example, 40 to 50 weight percent.

The adhesive composition of this invention comprises the carboxylated SBR emulsion and a tackifying resin emulsion. The tackifying resin emulsions useful in the preparation of pressure-sensitive adhesive compositions in accordance with this invention are also commercially available. Such emulsions include emulsified rosin, partially decarboxylated rosin, glycerol esters of polymerized rosin, partially dimerized rosin, natural resins, hydrogenated wood rosin, plasticized hydrogenated rosin, aliphatic hydrocarbon resins derived from petroleum, aromatic resins derived from petroleum, terpene resins, coal tar polyindene resins, ethylene vinyl acetate copolymer resins, terpene phenolics, coumarone-indenes, rosin esters, pentaerythritol esters, and polydicyclobutadiene resins. The properties of the adhesive composition can be varied for particular applications by the selection of an appropriate tackifying resin.

Both the SBR emulsion and the tackifying resin emulsion preferably include an anionic or nonionic emulsifier. Anionic emulsifiers are preferred for good mechanical stability under high shear conditions such as those prevailing in certain pumping and coating equipment. Particularly preferred are synthetic anionic emulsifiers such as alkaline metal soaps of rosin acids. As is well known, rosin is a natural product obtained from pine trees either from the oleo resin tapped from living trees or by extraction from tree stumps. The principal constituents of rosin are resin acids of the abietic and pimaric types having the general formula $C_{19}H_{29}COOH$, and having a phenanthrene nucleus. Rosin acid soaps are also available commercially.

The tackifying resin emulsion can also include conventional softeners, plasticizers, anti-oxidants and the like, which can be emulsified along with the tackifying resin or emulsified separately and mixed with the tackifying resin emulsion. Useful plasticizers include paraffinic oils and, preferably, aromatic oils. Plasticizers which are customarily used in combination with a given resin can be used in combination with the same resin in emulsion adhesive compositions in the present invention. Relatively soft resins, for example resins having a softening point of below about 50° C. and preferably below about 30° C., are preferred. Another kind of resin that can be used is an alkylated aromatic resin.

Pressure-sensitive adhesive compositions of the present invention include 40 to 50 percent by weight on a dry basis of carboxylated SBR emulsion, 50 to 60 percent by weight on a dry basis of a tackifying resin, and preferably 20 to 30 percent by weight based on the combined dry weight of the carboxylated SBR and tackifying resin solids, of a plasticizer such as an aromatic oil. In addition, optional ingredients such as antioxidants can also be included. The adhesive composition preferably has a sufficiently high solids content to give quick drying performance, typically above about 40 weight percent solids based on the total weight of the adhesive composition, the remainder being water.

The adhesive compositions of the present invention can be prepared by blending commercially available carboxylated SBR emulsions and tackifying resin emulsions. Alternatively, the useful tackifying resin emulsion can be prepared by combining an appropriate resin such as an alkylated aromatic resin, an emulsifier such as a rosin acid soap, a plasticizer such as an aromatic oil, antioxidants, and the like with sufficient water to give a tackifying resin emulsion of the desired solids content, and forming the tackifying resin emulsion by subjecting the mixture to heat and agitation. The adhesive composition can then be prepared by combining a carboxylated SBR emulsion with the prepared tackifying resin emulsion but are not intended to limit the scope of the invention in any manner. For example, variation in selection of carboxylated SBR emulsion and tackifying resin emulsion can be made dependent upon the end use and desired properties of the resultant carboxylated SBR pressure-sensitive adhesive.

The following examples illustrate specific embodiments of the present invention.

EXAMPLE 1

The following pressure-sensitive adhesive was developed for use in combination with polyethylene terephthalate film.

The pressure-sensitive adhesive contained the following ingredients in the indicated amounts:

| | Parts by Weight |
|---|---|
| Carboxylated SBR emulsion (Goodyear LPF4744, a commercially available SBR emulsion of Goodyear Tire and Rubber Co.) | 220.0 |
| Tackifying Resin (Zonester 85, commercially available from Arizona Chemical Co.) | 37.5 |
| Softener (Dutrex 298, commercially available from Shell Chemical Co.) | 30.0 |
| Plasticizer (Aromatic Plasticizer 10, commercially available from Hercules, Inc.) | 24.5 |
| Anionic Emulsifier (Dresinate 515, a commercially available rosin acid soap from Hercules, Inc.) | 25.0 |
| Tackifying Resin (Dihydroabietic acid triester with glycol, Staybelite Ester 10, commercially available from Hercules, Inc.) | 12.0 |
| Antioxidant (Polygard HR, commercially available from Uniroyal Chemical) | 1.5 |
| $H_2O$ | 25.0 |

The tackifying resin, softener, plasticizer and emulsifiers were heated to their softening point and the water was added. The mixture was agitated to form the tackifying emulsion.

The carboxylated SBR emulsion was then blended into the tackifying resin emulsion.

The pressure-sensitive adhesive formed was coated on a polyethylene terephthalate film and had the following qualities.

| | Initial | 1 Week 70° C. | 2 Weeks 70° C. | 4 Weeks 70° C. |
|---|---|---|---|---|
| 180° Peel (lbs/in) | 4.6 | 4.3 | 5.6 | 5.7 |
| 500g Static Shear (hrs) | 0.6 | 3.3 | 1.5 | 9.0 |
| TLMI Loop Tack (lbs/in) | 2.0 | 2.3 | 2.0 | 2.3 |

The 180° Peel Adhesion Test conducted was the Pressure-Sensitive Tape Council Test No. 1. The 500 g Static Shear Test was conducted in accordance with the Pressure-Sensitive Tape Council Test No. 7. The TLMI Loop Tack test was conducted in accordance with the Tag Label Manufacturers Institute test for loop tack testing.

EXAMPLE 2

The experiment of Example 1 was repeated in all essential details except the tackifying resin prepared had the following formulation:

| | |
|---|---|
| Alkylated aromatic resin (Piccovar L-30 commercially available from Hercules Inc.) | 160g |
| Anionic emulsifier (Dresinate 214, a resin acid soap of Hercules Inc.) | 40g |
| Aromatic plasticizer (AP-10) | 60g |
| Antioxidant (Polygard HR) | 4g |
| Dimethyl amino-2-propanol | 2g |
| $H_2O$ | 80g |

To the tackifying resin emulsion was added a carboxylated SBR emulsion (Goodyear LPF4744) to make a 29 percent polymer solids by weight to 71 percent modifier, excluding water. A pressure-sensitive carboxylated SBR adhesive was formed upon blending the two emulsions.

To determine the effect of carboxylation of the SBR on the pressure-sensitive adhesives, two non-carboxylated SBR adhesives were formed by blending with the above described tackifying resin a first non-carboxylated SBR emulsion (Goodyear 1582) and a second non-carboxylated SBR emulsion (Goodyear 5300).

The results of pressure-sensitive adhesive testing conducted as in Example 1 on the three adhesive compositions were as follows:

| | 4744 | 1582 | 5300 |
|---|---|---|---|
| 180° Peel Adhesion (lb/in) | 3.5 | 1.0 | 2.4 |
| 500g Static Shear (hr) | 0.8 | 0.4 | 1.0 |
| TLMI Loop Tack (lb/in) | 3.0 | 1.0 | 1.2 |
| Coating Weight (g/m²) | 22 | 24 | 23 |

The carboxylated SBR pressure-sensitive adhesive exhibited better adhesion qualities than the non-carboxylated SBR formulations.

EXAMPLE 3

The experiment of Example 1 was repeated in every essential detail except the carboxylated SBR emulsion used was Goodyear LPF4744 in an amount of 220 parts by weight and the tackifying resin emulsion had the following composition:

| | Parts by Weight |
|---|---|
| Tackifying resin (Wingtack 76, commercially available from Goodyear Tire and Rubber Co. | 34 |
| Softener (Dutrex 298) | 22 |
| (Pexalyn A-500) | 12 |
| Aromatic Plasticizer (AP10) | 17 |
| Anionic emulsifier (Dresinate 515) | 25 |
| Dimethyl-amino-2-propanol | 4 |
| $H_2O$ | 30 |

The pressure-sensitive adhesive formed upon blending the two emulsions had the following characteristics:

| | |
|---|---|
| 180° Peel Adhesion (lbs/in) | 7.0 |
| 500g Static Shear (hrs) | 0.9 |
| TLMI Loop Tack (lbs/in) | 2.9 |

EXAMPLE 4

The experiment of Example 1 was repeated in every essential detail except the tackifying resin emulsion was prepared having the following composition:

| | Parts by Weight |
|---|---|
| Tackifying resin (Pexalyn A-500) | 34 |
| Softener (Dutrex 298) | 22 |
| Aromatic Plasticizer (AP-10) | 17 |
| Anionic emulsifier (Dresinate 515) | 25 |
| Dimethyl-amino-2-propanol | 5.0 |
| $H_2O$ | 60.1 |

The tackifying resin emulsion was blended with an aqueous emulsion of a carboxylated SBR polymer (Goodyear LPF4744) in a blend that was 55 percent by weight tackifying resin emulsion and 45 percent carboxylated SBR polymer emulsion.

The adhesive composition had the following qualities:

| | |
|---|---|
| 180° Peel Adhesion (lb/in) | 7.3 |
| 500g Static Shear (hr) | 1.4 |
| TLMI Loop Tack (lb/in) | 1.8 |

EXAMPLE 5

The experiment of Example 4 was repeated in all essential details except the tackifying resin emulsion had the following composition:

| | Parts by Weight |
|---|---|
| Tackifying Resin (Wingtack 76) | 31 |
| Softener (Dutrex 298) | 39 |
| Tackifier (Pexalyn A-500) | 15 |
| Anionic Emulsifier (Dresinate 515) | 25 |
| Dimethyl-amino-2-propanol | 4 |
| $H_2O$ | 60 |

The tackifying resin emulsion was blended with an aqueous emulsion of a carboxylated SBR polymer (Goodyear LPF4744) in a blend that was 55 percent by weight tackifying resin emulsion and 45 percent carboxylated SBR polymer emulsion.

The adhesive composition formed had the following qualities:

| | |
|---|---|
| 180° Peel Adhesion (lb/in) | 5.8 |
| 500g Static Shear (hr) | 0.3 |
| TLMI Loop Tack (lb/in) | 4.4 |

What is claimed is:

1. An emulsion pressure-sensitive adhesive composition comprising:
    (a) an aqueous emulsion having from about 40 to about 50 percent by weight on a dry basis of carboxylated styrene butadiene rubber polymer having a bound styrene content of less than about 50 percent and at least about 0.5 percent carboxylation; and (b) an aqueous emulsion having from about 50 to about 60 percent by weight on a dry basis of tackifying resin.

2. The emulsion pressure-sensitive adhesive composition as recited in claim 1 wherein the styrene content of the carboxylated styrene butadiene rubber polymer is from about 20 to about 50 percent.

3. The emulsion pressure-sensitive adhesive composition as recited in claim 1 wherein the carboxylated styrene butadiene rubber polymer is from about 0.5 to about 5 percent carboxylated.

4. The emulsion pressure-sensitive adhesive composition as recited in claim 1 wherein the aqueous emulsion of a carboxylated styrene butadiene rubber has a solids content of at least about 40 percent by weight.

5. The emulsion pressure-sensitive adhesive composition as recited in claim 1 further comprising an anionic emulsifier for emulsifying the aqueous emulsion of the carboxylated styrene butadiene rubber and the aqueous emulsion of a tackifying resin.

6. The emulsion pressure-sensitive adhesive composition as recited in claim 5 wherein the anionic emulsifier is an alkaline metal soap of a rosin acid.

7. The emulsion pressure-sensitive adhesive composition as recited in claim 1 further comprising a nonionic emulsifier.

8. The emulsion pressure-sensitive adhesive composition as recited in claim 1 wherein the aqueous tackifying resin emulsion comprises water, an anionic emulsifier and at least one tackifier composition selected from the group consisting of rosin, partially decarboxylated rosin, glycerol esters of polymerized rosin, partially dimerized rosin, hydrogenated wood rosin, plasticized hydrogenated rosins, aliphatic hydrocarbon resins derived from petroleum, aromatic resins derived from petroleum, terpene resins, coal tar polyindene resins, ethylene vinyl acetate copolymer resins, terpene phenolics, coumarone-indenes, rosin esters, pentaerythritol esters, and polydicyclobutadiene esters.

9. The emulsion pressure-sensitive adhesive composition as recited in claim 1 further comprising a plasticizer blended with the aqueous tackifying resin emulsion.

10. The emulsion pressure-sensitive adhesive composition as recited in claim 9 wherein the plasticizer is an aromatic oil.

11. The emulsion pressure-sensitive adhesive composition as recited in claim 9 wherein the plasticizer is a paraffinic oil.

12. The emulsion pressure-sensitive adhesive composition as recited in claim 9 wherein said emulsion pressure-sensitive adhesive composition comprises from about 40 to about 50 weight percent the carboxylated styrene butadiene rubber polymer on a dry basis, from about 50 to about 60 weight percent the tackifying resin on a dry basis and an aromatic oil plasticizer from about 20 to about 30 weight percent of the combined dry weight of the carboxylated styrene butadiene rubber polymer and tackifying resin.

* * * * *